United States Patent [19]
Matrick

[11] 4,257,951
[45] Mar. 24, 1981

[54] TWO-STEP MILLING PROCESS FOR PREPARING PIGMENTARY COPPER PHTHALOCYANINE

[75] Inventor: Howard Matrick, Newark, Del.

[73] Assignee: E. I. Du Pont de Nemours and Company, Wilmington, Del.

[21] Appl. No.: 128,458

[22] Filed: Mar. 24, 1980

Related U.S. Application Data

[63] Continuation-in-part of Ser. No. 62,334, Jul. 31, 1979, abandoned.

[51] Int. Cl.[3] .............................................. C09B 47/04
[52] U.S. Cl. ............................ 260/314.5; 106/288 Q; 106/309
[58] Field of Search ................ 260/314.5; 106/288 Q, 106/309

[56] References Cited

U.S. PATENT DOCUMENTS

| | | | |
|---|---|---|---|
| 2,556,728 | 6/1951 | Graham | 260/314.5 |
| 2,556,730 | 6/1951 | Graham | 260/314.5 |
| 3,017,414 | 1/1962 | Minnich et al. | 260/279 |
| 3,030,370 | 4/1962 | Jackson | 260/314.5 |
| 3,598,625 | 8/1971 | Buckwalter | 106/309 |
| 4,088,506 | 5/1978 | Wetzel | 106/288 Q |

OTHER PUBLICATIONS

Moser et al., Phthalocyanine Compounds, pp. 157–162, Reinhold Pub. Corp., NY, (1963).

*Primary Examiner*—John D. Randolph

[57] ABSTRACT

Converting crude copper phthalocyanine (CPC) to pigmentary copper phthalocyanine (CPC) by two-stage milling with 5–400% by weight of alum and 0.6–3.7 cc of organic liquid per 100 grams of CPC in the first stage and 1.2–9.8 cc of organic liquid per 100 grams of CPC in the second stage with the total organic liquid being 4–13 cc per 100 grams CPC.

15 Claims, No Drawings

TWO-STEP MILLING PROCESS FOR PREPARING PIGMENTARY COPPER PHTHALOCYANINE

CROSS REFERENCE TO RELATED APPLICATION

This is a continuation-in-part of copending application Ser. No. 062,334, filed July 31, 1979 now abandoned.

DESCRIPTION

1. Technical Field

The process of this invention relates to the preparation of pigmentary copper phthalocyanine by a two-step milling process involving minimal amounts of a salt. More particularly, the process of this invention relates to the preparation of pigmentary copper phthalocyanine by a two-step process involving milling the pigment in the presence of 5–400% of $Al_2(SO_4)_3$. 15–18 $H_2O$ based on the pigment and 0.6–3.7 cc of an organic liquid per 100 grams of copper phthalocyanine and then milling further with an additional 1.2–9.8 cc of organic liquid per 100 grams of copper phthalocyanine such that a total organic liquid of 4–13 cc per 100 grams of crude copper phthalocyanine.

2. Background Art

The prior art processes for the preparation of the alpha and beta phase of pigmentary copper phthalocyanine, as well as the metal-free phthalocyanine and other metal phthalocyanines, have generally involved a process for particle size reduction combined with exposure to a solvent which promotes the phase conversion. U.S. Pat. Nos. 2,556,728 and 2,556,730 are illustrative of a process in which the particle size reduction is brought about by salt milling, and the phase conversion is brought about by the presence of a small amount of certain crystallizing solvents, such as aromatic hydrocarbons or certain chlorinated hydrocarbons. If the solvent were absent, the salt milling would invariably give the alpha phase product; but when such a solvent is present in sufficient quantity, the product is in the beta crystal phase.

A relatively reddish copper phthalocyanine blue is obtained by acid pasting or salt milling and a relatively greenish shade of copper phthalocyanine blue is obtained by grinding in acetone or by milling with salt in the presence of a crystallizing solvent. The reddish colored pigment is the alpha crystal phase while the greenish pigment is the beta crystal phase.

Primarily because of environmental and cost consideration it would be desirable if the amount of salt used in milling could be reduced below that known in the art for the processes described.

DISCLOSURE OF THE INVENTION

Now a process has been found that is an improvement of processes known in the art for converting crude copper phthalocyanine (CPC) into pigmentary form. Accordingly, in the process comprising converting crude CPC to pigmentary form by dry milling said crude, contacting the milled crude with an organic liquid in water emulsion and recovering the CPC in pigmentary form, an improvement has been found wherein the crude CPC is dry milled in the presence of 5–400% by weight of $Al_2(SO_4)_3$.15–18 $H_2O$ and 0.6–3.7 cubic centimeters of organic liquid per 100 grams of crude CPC in a first stage and dry milled in the presence of said $Al_2(SO_4)_3$.15–18 $H_2O$ and 1.2–9.8 cubic centimeters of organic liquid per 100 grams of crude CPC in a second stage. The 1.2–9.8 cc of organic liquid of the second stage is in addition to the 0.6–3.7 cc of the first stage. The total amount of organic liquid in the first stage plus the second stage is in the range of 4–13 cc inclusive per 100 grams of CPC crude pigment.

It is important that the crystal form of CPC be maintained as beta during milling. If the milling is conducted without an organic solvent as the particle size is reduced, the tendency would be to convert the beta crystals to the alpha form. However, the process of this invention requires that substantially all of the CPC be in beta crystal form at the conclusion of milling. The process of this invention employs organic solvents in order to maintain the CPC in the beta crystal form at the conclusion of the milling.

The process of the present invention not only results in a pigment with increased intensity (purity of color) compared to pigment prepared with larger amounts of organic liquid, but also involves the usage of less alum which permits a greater productivity.

The milling must be carried out at a temperature below 70° C. Preferably this temperature is 60°–65° C. At temperatures of 71° C. $Al_2(SO_4)_3$.15 $H_2O$ melts with decomposition, releasing water which can cause mill caking.

Crude CPC within the scope of this invention is that CPC which requires a particle size reduction before it can be used as a pigment. Processes that involve the preparation of CPC in organic solvents produce a crude pigment which usually requires further particle size reduction.

With the exception of the use of a relatively small amount of aluminum sulfate in the dry milling of crude CPC and the solvent levels used, the milling operation is similar to that described in U.S. Pat. Nos. 3,017,414 and 3,030,370. Dry milling, as used herein, means milling in the complete absence of liquids or, if liquids are used, such as crystal phase directing solvent or a surface-active agent, they are present in such small amounts that the mill charge retains the characteristics of a dry powder. For example, the dry milling of the crude of this invention is generally conducted using inert grinding elements, such as steel rods, balls, nails and, e.g., iron rods called "Cyl Pebs" and, optionally, a small quantity of surfactant. The bulk volume of the mill charge of grinding elements usually occupies about half the volume of the mill. The crude CPC to be milled and the aluminum sulfate generally at least fills the voids between these elements. The total charge in the mill is in the range of 60–65% of the total volume of the mill.

The milling time will vary depending upon the crude being milled, the mill loading and the size and type of mill being used. For plant scale mills, a minimum of 3–6 hours is usually required, and this time may be extended to 12–120 hours for smaller than plant scale mills. Thus, generally, the milling time can range from 3–120 hours.

The amount of organic liquid used in the first stage of milling is 0.6–3.7 cc, preferably 1–3 cc, per 100 grams of CPC crude pigment. If more than 3.7 cc of organic liquid is used, the particle size of the pigment will not be reduced sufficiently. Additionally, caking can occur which prevents pigment from readily being discharged from the mill. Organic liquid below 0.6 cc is simply not sufficient to influence the crystal phase of the CPC pigment.

The total amount of organic liquid added in the second stage is 1.2–9.8 cc, preferably 2–8 cc, per 100 grams of CPC parts pigment. More than 9.8 cc or less than 1.2 cc will not give the advantages of the invention.

The amount of organic liquid in the first stage and the second stage is controlled so as to have the total addition of organic liquid in the range of 4–13 cc per 100 grams crude CPC.

The amount of $Al_2(SO_4)_3.15–18\ H_2O$ used varies from 5–400% by weight, preferably 25–200%, most preferably 50–100%, based on the pigment. Amounts greater than 400% are operable but involve disposal of greater amounts of said alum. Amounts less than 5% do not give the advantages of the present invention.

A wide choice of organic liquids for the milling as well as the later slurry operation are available. The organic liquid may or may not be the same in milling as that used in the water organic liquid emulsion. Any anhydrous organic solvent considered water insoluble having a boiling point high enough to withstand the heat of milling without substantial volatilization and low enough to permit removal by steam distillation is operable. Generally, a boiling point between 60°–220° C. is convenient.

Useful organic liquids include chlorinated aliphatic hydrocarbons, unsubstituted aromatic hydrocarbons, chlorinated aromatic hydrocarbons, nitrated aromatic hydrocarbons, aromatic nitriles and mixtures of these liquids. Representative examples of said organic liquids include tetrachloroethylene, xylene, methyl chloroform, symetrical tetrachloroethane, p-dichlorobenzene, o-dichlorobenzene, nitrobenzene, trichloroethylene, benzonitrile, carbon tetrachloride, trichlorobenzene and ethylene dichloride. Especially preferred organic liquids are chlorinated hydrocarbons with solubility parameters, $\gamma_D$ of 8.7–9.5 Hildebrands, such as carbon tetrachloride, tetrachloroethylene, ethylene dichloride, o-dichlorobenzene, chlorobenzene and trichloroethylene. Tetrachloroethylene (also referred to as perchloroethylene) is most preferred.

The milled pigment is then treated with an organic liquid-in-water emulsion which can be formed with or without a surface-active agent. The ratio of water to the organic liquid is not critical as long as there is sufficient water present to produce a fluid slurry.

In the practice of this invention a variety of surface-active agents such as anionic, cationic and nonionic may be used. From 1–15% by weight of surface-active agent, based on the weight of the crude should be present in the organic liquid in water emulsion if a surface-active agent is to be used. If a surface-active agent is used, only enough should be used to give a good emulsion. Too much surface-active agent dilutes the tinctorial properties of the pigment and can interfere with subsequent processing. However, emulsification can be achieved mechanically without a surface-active agent. In some applications, where a surface-active agent interfers with the end use for the pigment, it is preferred that no surface-active agent be used to prepare the emulsion.

After contacting the dry milled CPC with the organic liquid in water emulsion, the temperature of the resulting slurry should be 25°–97° C. and preferably from 50°–97° C. The organic liquid in water emulsion can be heated prior to forming the slurry, if desired, to decrease or eliminate heat-up time after slurry formation. The duration of contact at temperature can vary depending upon the particular premilled crude being treated and the intensity of agitation but usually ranges from 15 minutes to 10 hours and preferably from 30 minutes to 2 hours.

The organic liquid present in the emulsion is recovered by conventional means, e.g., steam distillation.

After completion of the contact with the organic liquid in water emulsion, the CPC can be isolated or further processed in the conventional manner. Since the dry milled CPC is commonly milled using iron or steel grinding elements, iron filings are usually present therein. Consequently to remove the iron filings, the slurry should be acidified prior to isolation or further processing of the pigment. The common practice involves adding sufficient acid to provide from 0.5–2% by weight of acid calculated as sulfuric acid and based on the weight of the acidified slurry. The acidified slurry is preferably held at a temperature of at least 85° C. from 30 minutes to 2 hours to insure dissolution of any iron which may be present.

The pigment prepared according to the invention can be subjected to a variety of treatments, depending on the end-use and specific properties desired.

The pigment is generally separated from the slurry by filtration and then washed, dried and pulverized. Further processing is not required before the pigment can be used.

The pigment prepared in accordance with the invention exhibits pigmentary properties, without the high cost and pollution problems associated with high-alum usage, that are at least equal in commercial value to pigment prepared by conventional high-alum milling.

A typical milling procedure in a clean 58-gallon ball mill would involve charging 40 lbs: chlorine-free CPC,
20 lbs: $Al_2(SO_4)_3.15–18\ H_2O$, and
1.6 lbs: perchloroethylene (2.45 cc per 100 grams of CPC)

to the mill. Milling is carried out at 60°–65° C. for 44 hours. At this point, 4.8 lbs perchloroethylene (9.8 cc per 100 grams of CPC) are added to bring the organic liquid to 12.25 cc per 100 grams of CPC and the milling continued for 30 minutes.

In the first stage, 2.45 cc perchloroethylene per 100 grams of CPC are used. The milling efficiency is somewhat decreased at more than 3.7 cc per 100 grams CPC and at 6.1 cc per 100 grams CPC the milling cakes.

In the second stage a level of 4.9 cc of organic liquid per 100 grams CPC results in a somewhat slow phase conversion when the first stage usage was 2.45 cc of organic liquid per 100 grams of CPC. At 9.2 cc organic liquid per 100 grams CPC in the second stage caking of the mill begins to occur. Therefore, a range of 4.9–9.8 cc organic liquid per 100 grams CPC in the second stage is desirable and 6.1–8.6 cc of organic liquid per 100 grams CPC is preferred.

EXAMPLES

The following examples illustrate the invention.

EXAMPLE 1

To a 58-gallon ball mill was added 1000 lbs: "Cyl Pebs" (cylindrical iron bars 1.77 cm diameter by 2.54 cm long)
40 lbs: copper phthalocyanine crude
20 lbs: $Al_2(SO_4)_3.15–18\ H_2O$
1.6 lbs: tetrachloroethylene (2.45 cc per 100 grams of CPC).

The mill was rotated at 40 rpm for 44 hours. After this first stage, the mill powder was a mixture of alpha and beta CPC. 4.8 Lbs tetrachloroethylene (7.35 cc per 100 grams CPC) was added and the mill was rotated for 15 minutes. After this second stage, the mill powder was substantially all beta CPC. The mill powder was discharged through a screen which retains the "Cyl Pebs" grinding media.

The mill powder was converted to finished pigment as follows:

In a 3-liter, 4-necked flask equipped with an agitator, thermometer, steam addition tube and water-cooled condenser was added 250 cc water and 5 g of isopropylamine salt of dodecylbenzene sulfonate. The mixture was agitated vigorously for 15 minutes at room temperature. To this was added over 15 minutes, with agitation, 69.5 g of the above-described mill powder. The slurry was stirred 15 minutes at room temperature. To this was added 30 cc tetrachloroethylene over 15 minutes and the pigment/emulsion slurry agitated 30 minutes longer. A solution of 6 cc 96% sulfuric acid in 140 cc water was added. Tetrachloroethylene was then slowly removed by steam distillation. This requires about 1 hour. When the slurry was completely free of tetrachloroethylene, it was filtered and washed acid free. Then the presscake was washed with 40 cc concentrated ammonium hydroxide in 400 cc water. The product was then washed base free, dried at 220° F. and pulverized.

When evaluated by a standard rubout technique in a lithographic varnish, the pigment showed a 5% strength advantage, improved intensity and greater transparency in masstone over a standard commercial pigment prepared by Comparative Example A.

EXAMPLE 2

Best Mode

Using an organic liquid emulsion without a surface-active agent

To a 58-gallon ball mill was added 1000 lbs: "Cyl Pebs" (cylindrical iron bars 1.7 cm diameter by 2.54 cm long)
30 lbs: copper phthalocyanine crude
0.9 lbs: Elvacite® 2046 (polymers and copolymers of esters of methacrylic acid)
30 lbs: $Al_2(SO_4)_3.15-18\ H_2O$
1.2 lbs: tetrachloroethylene (2.45 cc per 10 grams CA)

The mill was rotated at 40 rpm for 44 hours. After this first stage the mill powder was a mixture of alpha and beta CPC. Tetrachloroethylene (1.8 lbs, 7.35 cc per 100 grams CPC) was added and the mill was rotated for 15 minutes. After the second stage, the mill powder was mostly beta phase with slightly more alpha phase than in Example 1. The mill powder was discharged through a screen which retains "Cyl Pebs" grinding media.

To a 3-liter, 4-necked flask equipped with an agitator, thermometer, steam addition tube and distillation head with condenser was added 800 ml water, 6 ml 96% sulfuric acid and 270 g of the thus prepared mill powder. The mixture was stirred vigorously and 30 ml perchloroethylene added. The slurry was heated at 50°-55° C. for 30 minutes. Tetrachloroethylene was then removed by steam distillation. When the slurry was completely free of tetrachloroethylene, it was filtered and washed acid free. The presscake was washed with 40 cc concentrated ammonium hydroxide in 40 cc water, washed base free with water, dried at 220° F. and pulverized.

When evaluated by a standard rubout technique in a lithographic varnish, the pigment was slightly stronger, redder and more intense in tint with a darker masstone than the pigment prepared in Example 1.

COMPARATIVE EXAMPLE A

Single stage milling with organic liquid and excess alum

To a 58-gallon ball mill was added:

1000 lbs: "Cyl Pebs"
10 lbs: copper phthalocyanine crude
50 lbs: $Al_2(SO_4)_3.15-18\ H_2O$
1.36 lbs: perchloroethylene (8.3 cc per 100 grams CPC).

The mill was rotated for 24 hours at 40 rpm. The mill powder was discharged through a screen which retains "Cyl Pebs". The powder is added to 1000 lbs of 3% sulfuric acid. The slurry is held at 96°-99° C. for 1 hour, filtered, washed free of water soluble salts, dried at 104° C. and micropulverized.

The process uses 5 lbs of alum for every lb of pigment produced, whereas the process described in Example 1 used 0.5 lb alum per lb of pigment.

COMPARATIVE EXAMPLE B

With more organic liquid than the present invention in milling

To a 58-gallon mill was added:

1000 lbs: "Cyl Pebs"
40 lbs: copper phthalocyanine crude
20 lbs: $Al_2(SO_4)_3.15-18\ H_2O$
4 lbs: perchloroethylene (6.2 cc per 100 grams CPC).

The mill was rotated at 40 rpm for 40 hours. At this time, attempts to discharge the mill produced a very low yield of mill powder. Most of the mill charge had formed a nonflowing solid cake due to the high initial amount of perchloroethylene and could not be recovered.

COMPARATIVE EXAMPLE C

Without organic liquid emulsion

The mill powder, 60 lbs, from Example 1, before conversion to finished pigment, was added to 1000 lbs of 3% sulfuric acid and the slurry held for 1 hour at 96°-99°. After filtration washing, drying and pulverization, the product was found to be more than twice as weak tinctorially as the pigment of Comparative Example A when evaluated by rubout in lithographic varnish.

COMPARATIVE EXAMPLE D

Without alum and organic liquid in milling

To a 58-gallon mill was added:

1000 lbs "Cyl Pebs"
40 lbs copper phthalocyanine.

The mill was rotated for 40 hours at 40 rpm, discharged and the mill powder converted to finished pigment as follows:

In a 3-liter, 4-necked flask equipped with an agitator, thermometer, steam addition tube and water-cooled condenser was added 250 cc water and 5 g of isopropylamine salt of dodecylbenzene sulfonate. The mixture was agitated vigorously for 15 minutes. To this was added over 15 minutes, with agitation, 69.5 g of the above-described mill powder. The slurry was stirred 15 minutes. To this was added 30 cc perchloroethylene over 15 minutes and the pigment/emulsion slurry agitated 30 minutes longer. A solution of 6 ml 96% sulfuric acid in 140 cc water was added. Perchloroethylene was then slowly removed by steam distillation. This requires about 1 hour. When the slurry was completely free of perchloroethylene, it was filtered and washed acid free. Then the presscake was washed with 40 cc concentrated ammonium hydroxide in 400 cc water. The product was then washed base free, dried at 220° F. and pulverized.

The product evaluated by rubout is weak and exceedingly dull as compared to Comparative Example A.

INDUSTRIAL APPLICABILITY

The pigments of this invention are chiefly used for printing inks but also in paints and plastics.

I claim:

1. A two-stage milling process for preparing pigmentary copper phthalocyanine comprising milling crude copper phthalocyanine with a 5–400% by weight of $Al_2(SO_4)_3.15$–$18\ H_2O$ based on the crude and 0.6–3.7 cc per 100 grams of copper phthalocyanine of an organic liquid in the first stage, milling said crude further with an additional 1.2–9.8 cc per 100 grams of copper phthalocyanine of an organic liquid in a second stage, the total amount of organic liquid charged in both stages is in the range of 4–13 cc inclusive per 100 grams of copper phthalocyanine, treating the milled copper phthalocyanine with an emulsion of a water-insoluble organic liquid in water with or without a surface-active agent at a temperature of 24°–97° C. for 15 minutes to 10 hours, removing the organic liquid and recovering copper phthalocyanine in pigmentary form.

2. The process of claim 1 wherein the amount of organic liquid in the first milling stage is 1–3 cc and the amount in the second stage is 2–8 cc.

3. The process of claim 2 wherein the organic liquid in the milling stages is tetrachloroethylene.

4. The process of claim 1 wherein the amount of $Al_2(SO_4)_3.15$–$18\ H_2O$ is 25–200% by weight.

5. The process of claim 4 wherein the amount of organic liquid in the first milling stage is 1–3 cc and the amount in the second stage is 2–8 cc.

6. The process of claim 1 wherein the amount of $Al_2(SO_4)_3.15$–$18\ H_2O$ is 50–100% by weight.

7. The process of claim 6 wherein the amount of organic liquid in the first milling stage is 1–3 cc and the amount in the second stage is 2–8 cc.

8. The process of claim 1 wherein the organic liquid is tetrachloroethylene.

9. The process of claim 8 wherein the $Al_2(SO_4)_3.15$–$18\ H_2O$ is 25–200%.

10. The process of claim 8 wherein the $Al_2(SO_4)_3.15$–$18\ H_2O$ is 50–100% by weight.

11. The process of claim 1 wherein the milled copper phthalocyanine is treated in the emulsion formed without a surface-active agent.

12. The process of claim 11 wherein the amount of organic liquid in the first milling stage is 1–3 cc and the amount in the second stage is 2–8 cc.

13. The process of claim 11 wherein the amount of $Al_2(SO_4)_3.15$–$18\ H_2O$ is 25–200% by weight.

14. The process of claim 11 wherein the amount of $Al_2(SO_4)_3.15$–$18\ H_2O$ is 50–100% by weight.

15. The process of claim 11 wherein the organic liquid is tetrachloroethylene.

* * * * *